United States Patent
DeBlanc et al.

(10) Patent No.: US 6,517,358 B2
(45) Date of Patent: Feb. 11, 2003

(54) METHOD AND SYSTEM FOR DIRECTLY INTERCONNECTING STORAGE DEVICES TO CONTROLLER CARDS WITHIN A HIGHLY AVAILABLE STORAGE SYSTEM

(75) Inventors: James J. DeBlanc, Roseville, CA (US); David Dickey, Roseville, CA (US); James Lawrence White, Roseville, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 81 days.

(21) Appl. No.: 09/735,436

(22) Filed: Dec. 12, 2000

(65) Prior Publication Data

US 2002/0071192 A1 Jun. 13, 2002

(51) Int. Cl.$^7$ ................................................ H01R 9/09
(52) U.S. Cl. ........................................... 439/61; 307/23
(58) Field of Search ............................ 439/61, 65, 79, 439/544; 361/790, 803, 805; 307/27, 23, 64

(56) References Cited

U.S. PATENT DOCUMENTS

| | | | | |
|---|---|---|---|---|
| 3,590,330 A | * | 6/1971 | Teagno et al. | ............... 361/790 |
| 4,703,394 A | * | 10/1987 | Petit et al. | ................... 361/790 |
| 4,790,763 A | * | 12/1988 | Weber et al. | .................. 439/65 |
| 4,907,977 A | * | 3/1990 | Porter | ......................... 439/629 |
| 5,495,397 A | * | 2/1996 | Davidson et al. | ........... 361/784 |
| 6,097,303 A | * | 8/2000 | Lunz et al. | .................. 340/825 |
| 6,126,451 A | * | 10/2000 | Zandy et al. | ................ 361/777 |

* cited by examiner

*Primary Examiner*—Neil Abrams
*Assistant Examiner*—Phuong KT Dinh

(57) ABSTRACT

Method and system for enhancing the reliability of an available storage subsystem. Data storage units are equipped with a number of I/O controller-card adaptors that mate with complementary adaptors affixed to a number of redundant I/O controller cards. The data storage devices plug directly into I/O controller cards and receive all data, control signals, and power equally from the I/O controller cards, eliminating the need for a midplane circuit card.

8 Claims, 3 Drawing Sheets

METHOD AND SYSTEM FOR DIRECTLY INTERCONNECTING STORAGE DEVICES TO CONTROLLER CARDS WITHIN A HIGHLY AVAILABLE STORAGE SYSTEM

TECHNICAL FIELD

The present invention relates to methods and systems for enhancing the reliability of storage systems and, in particular, to a method and system that allows storage devices to be directly interconnected with multiple controller cards in order to eliminate the need for a midplane circuit card that represents a single point of failure within the storage system.

BACKGROUND OF THE INVENTION

With the decrease in cost and increase in capacity of mass storage devices, increase in data-storage and data-access requirements of computer systems and software applications, and increase in the bandwidth of interconnection technologies, such as the fibre channel, large storage subsystems that are interconnected with one or more remote computers via a communications medium are becoming increasingly popular data storage solutions in the computing industry. Storage subsystems may provide far higher data storage capacities than storage devices directly included within computer systems, and provide shared access to large volumes of data to many different remote computer systems. In addition, mass storage subsystems can be centrally located in secure facilities with multiple, independent communications media interconnections, fail-over power generation facilities, and geographic isolation from various natural and man-made hazards in order to provide better security for the stored data.

As modern computer applications and computer systems have grown more dependent on the security of data stored in storage subsystems, much research and development effort has been devoted to improving and enhancing the internal reliability of mass storage subsystems. A powerful technique for enhancing reliability, commonly applied in the development of high-availability storage subsystems, is to identify single points of failures within the storage subsystems and eliminate single points of failure by substituting for a single component a number of redundant components that can assume full operational loads under fail-over conditions due to failure of one of the number of redundant components.

FIG. 1 illustrates redundant interconnection of data storage devices to communications controllers within a storage subsystem. Note that FIG. 1 is a highly simplified representation of a storage system, and omits a great many components not required for illustration of the redundant interconnection of data storage devices to a communications controller. The storage subsystem 100 includes eight data storage devices 102–109, commonly magnetic disk drives. The data storage devices 102–109 are electronically connected to a midplane circuit board 110. The midplane circuit board provides data, control signal, and power interconnection with input/output ("I/O") controllers and power supplies. Two redundant I/O controller cards 112 and 113 are also connected to the midplane circuit board 110 via data, control signal, and power lines. I/O controller cards 112 and 113 are additionally interconnected with one or more communications media, such as fibre channels, via fibre channel adaptors 114–117. In certain implementations, the two fibre channel adapters on an I/O controller card may serve as redundant connections to a single fibre channel, in other implementations, the two fibre channel adaptors mat serve to daisy chain the data storage subsystem into a larger arbitrated loop. The I/O controller cards 112–113 implement communications protocols and I/O bus protocols to transfer data and commands from the communications media to the data storage devices 102–109 and transfer data and command execution status information from the data storage devices 102–109 to the communications medium. The storage subsystem illustrated in FIG. 1 is highly available because the data stored in the data storage devices 102–109 can be accessed by remote computers after a complete failure of either of the UO controller cards 112 or 113 or failure of either of two communications media interconnecting the data storage devices 102–109 with remote computers. By including redundant I/O controller cards 112–113, the highly available storage subsystem illustrated in FIG. 1 has eliminated a single point of failure present in previous storage subsystems that included only a single I/O controller card for interconnecting the data storage devices of the storage subsystem to a communications medium.

However, consideration of the storage subsystem illustrated in FIG. 1 reveals a remaining point of failure, namely the midplane circuit card 110. The midplane circuit card is a relatively passive device, generally lacking active electronic components and lacking mechanical components other than multi-pin adaptors that mate with complementary adaptors of the I/O controller cards and data storage devices. However, although reasonably reliable, midplane circuit cards can fail for a variety of reasons, including electrical or mechanical damage that may occur during insertion of data storage devices into, and removal of data storage devices from, the storage subsystem. For this reason, designers and manufacturers of highly available storage subsystems have recognized the need for a method and system for eliminating the single point of failure represented by a midplane circuit card within a highly available storage subsystem.

SUMMARY OF THE INVENTION

The present invention provides a method and system for enhancing the reliability and availability of a storage subsystem by eliminating the midplane circuit card that electrically interconnects data storage devices within a currently available storage subsystem to I/O controller cards and power supplies. In one embodiment of the present invention, data storage devices are equipped with two adaptors complementary to adaptors directly affixed to I/O controller cards. In this embodiment, data storage devices having dual adaptors can be directly coupled to two I/O controller cards, without the need for an intermediary midplane circuit card. In an alternative embodiment of the present invention, an older style data storage device having a single midplane-circuit-card adaptor is fitted with an I/O adaptor card having a complementary adaptor that mates with the single midplane-circuit-card adaptor of the older style data storage device and having two I/O controller-card adaptors that mate with complementary adaptors directly affixed to two I/O controller cards. In both embodiments, each I/O controller card includes two power adaptors that connect the I/O controller card with one of two power supplies. In both embodiments, a data storage device can receive all necessary data, control signals, and power via either I/O controller-card adaptor and, when both I/O controller cards are operational, receives data, control signals, and power from both I/O controller cards. Thus, in both embodiments of the present invention, the single point of failure represented by a midplane circuit card currently used to interconnect data storage devices with I/O controller cards and power supplies is eliminated, increasing the reliability and availability of the storage subsystem as a whole. Additional design efficiencies, manufacturing efficiencies, and cost benefits may also accrue from elimination of the midplane circuit card.

DETAILED DESCRIPTION OF THE INVENTION

The present invention enhances the reliability of a storage subsystem, such as a disk array, by eliminating the midplane circuit card that interconnects data storage devices with I/O controller cards and power supplies in currently available storage subsystems. In currently available storage subsystems, the single midplane circuit card represents a single point of failure that, upon malfunction or failure, can compromise operation of an entire storage subsystem. Even when a failure related to the midplane circuit board is benign with respect to data retrieval and storage, the failure can result in loss of availability, since such failures can only be corrected when the storage subsystem is powered down and unavailable during repair or replacement.

Figure 2:
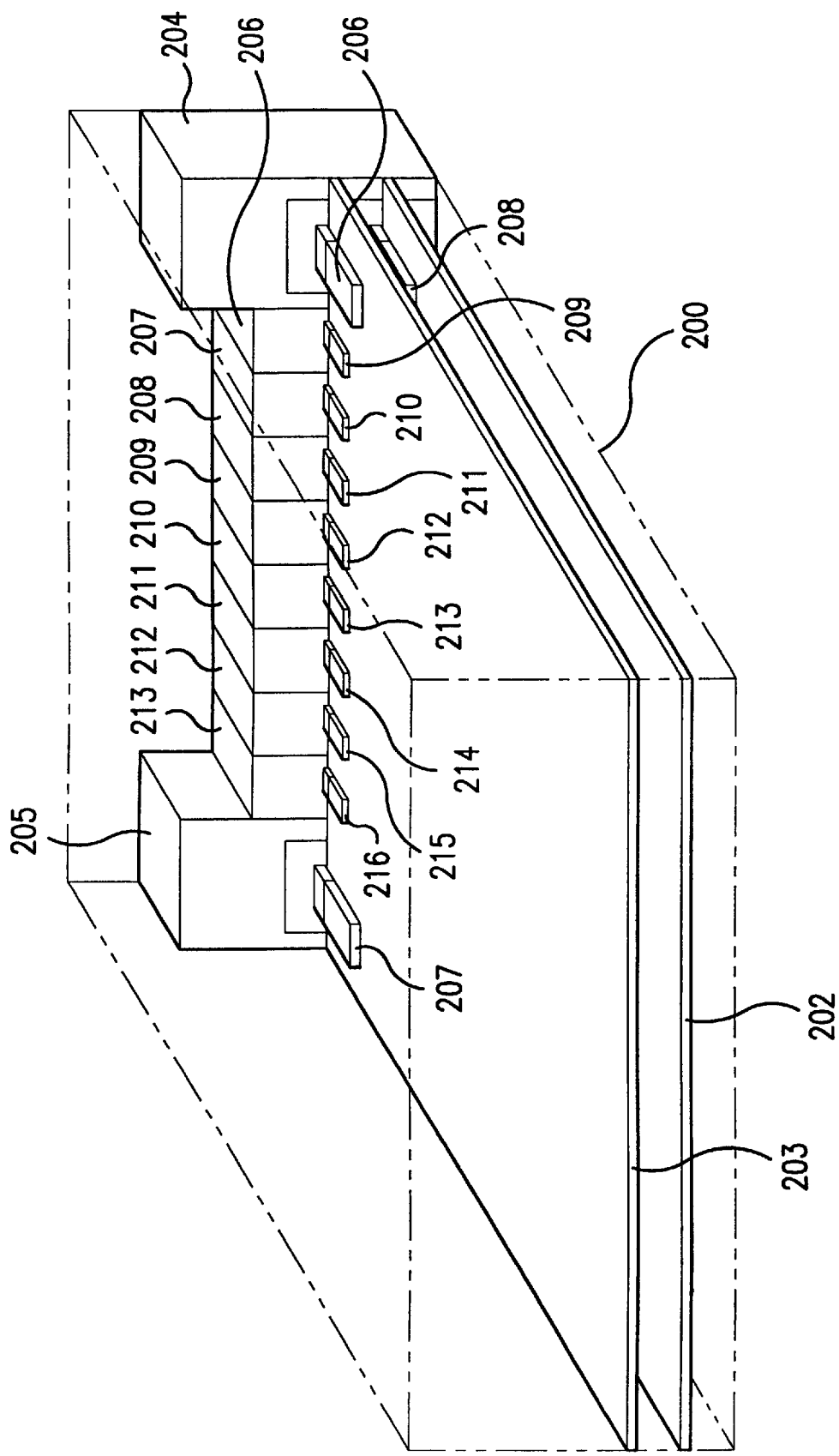
FIG. 2 illustrates a highly available storage subsystem employing the present invention.

FIG. 2 illustrates a highly available storage subsystem, such as a disk array, that employs the present invention. The storage subsystem 200 includes two I/O controller cards 202–203. The storage subsystem includes two power supply units 204–205 and eight data storage devices 206–213, commonly magnetic disk drives. Note that the two power supplies can be placed in alternative locations to allow for a larger number of data storage devices. Storage subsystems can be designed to contain tens or hundreds of data storage devices. Each I/O controller card 202–203 is interconnected with both power supplies via power adaptors 206–208 and interconnected with the data storage devices via I/O controller-card adaptors 209–216. Note that, in FIG. 2, one of the two power adaptors, and all of the I/O controller-card adaptors, for the lower I/O controller card are obscured by the upper I/O controller card 203. Consideration of the organization of the internal components of the highly available storage subsystem illustrated in FIG. 2 reveals no single point of failure. There are redundant power supplies, redundant I/O circuit cards, redundant interconnections between the power supplies and the I/O controller cards, and redundant interconnections between the data storage devices and the I/O controller cards. An additional advantage of the storage subsystem that incorporates one embodiment of the present invention, illustrated in FIG. 2, is potential manufacturing efficiencies, design efficiencies, and cost benefits that arise from elimination of the midplane circuit card positioned between the I/O controller cards and the data storage devices. As one example, midplane circuit boards present a large, vertical surface in the path of cooling airflows within a storage subsystem, and elimination of the midplane circuit board can greatly decrease thermal management design, implementation, and manufacturing costs and decrease the volume of the resulting storage system.

Figure 1:
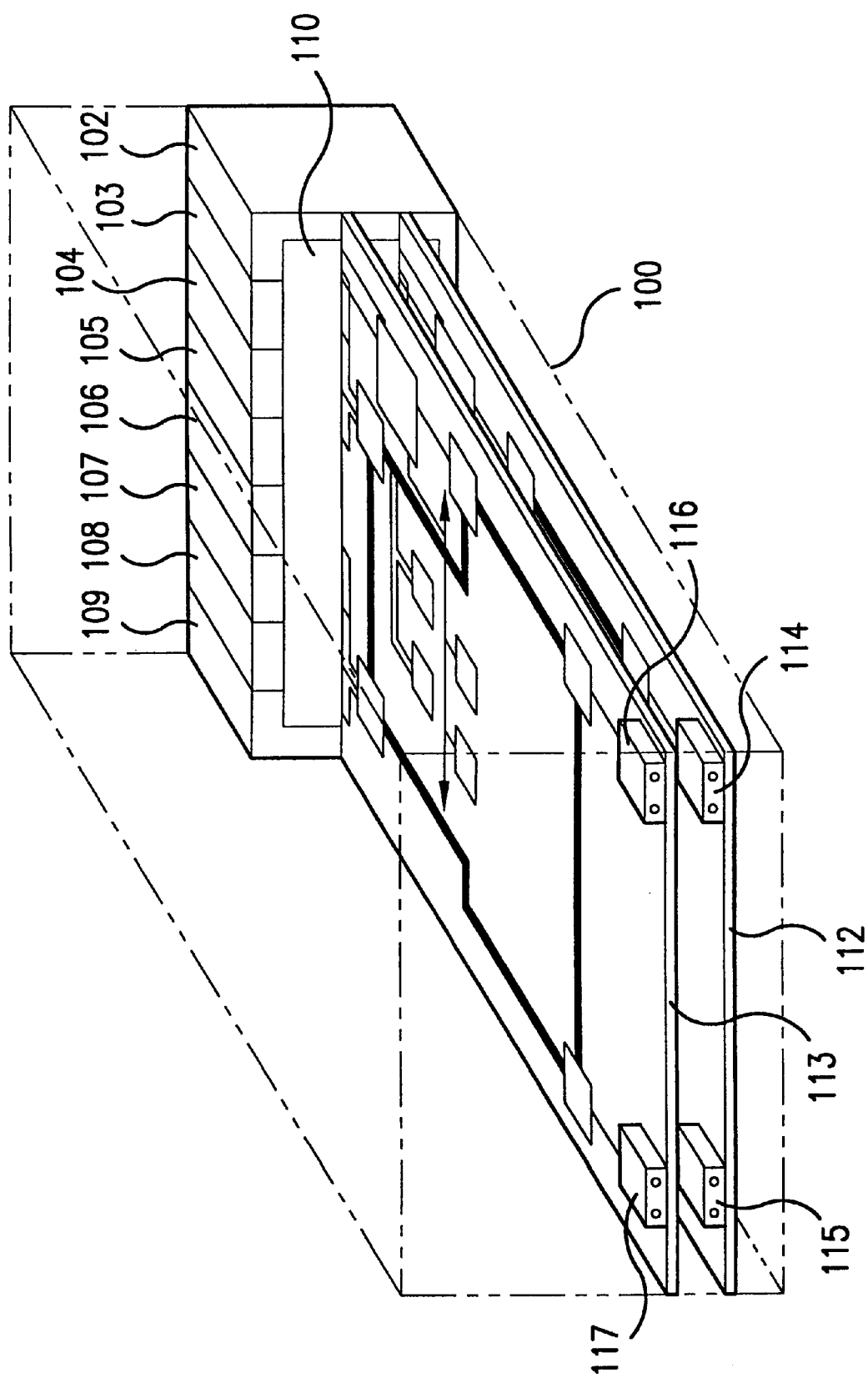
FIG. 1 illustrates redundant interconnection of data storage devices to communications controllers within a storage subsystem.
Figure 3:
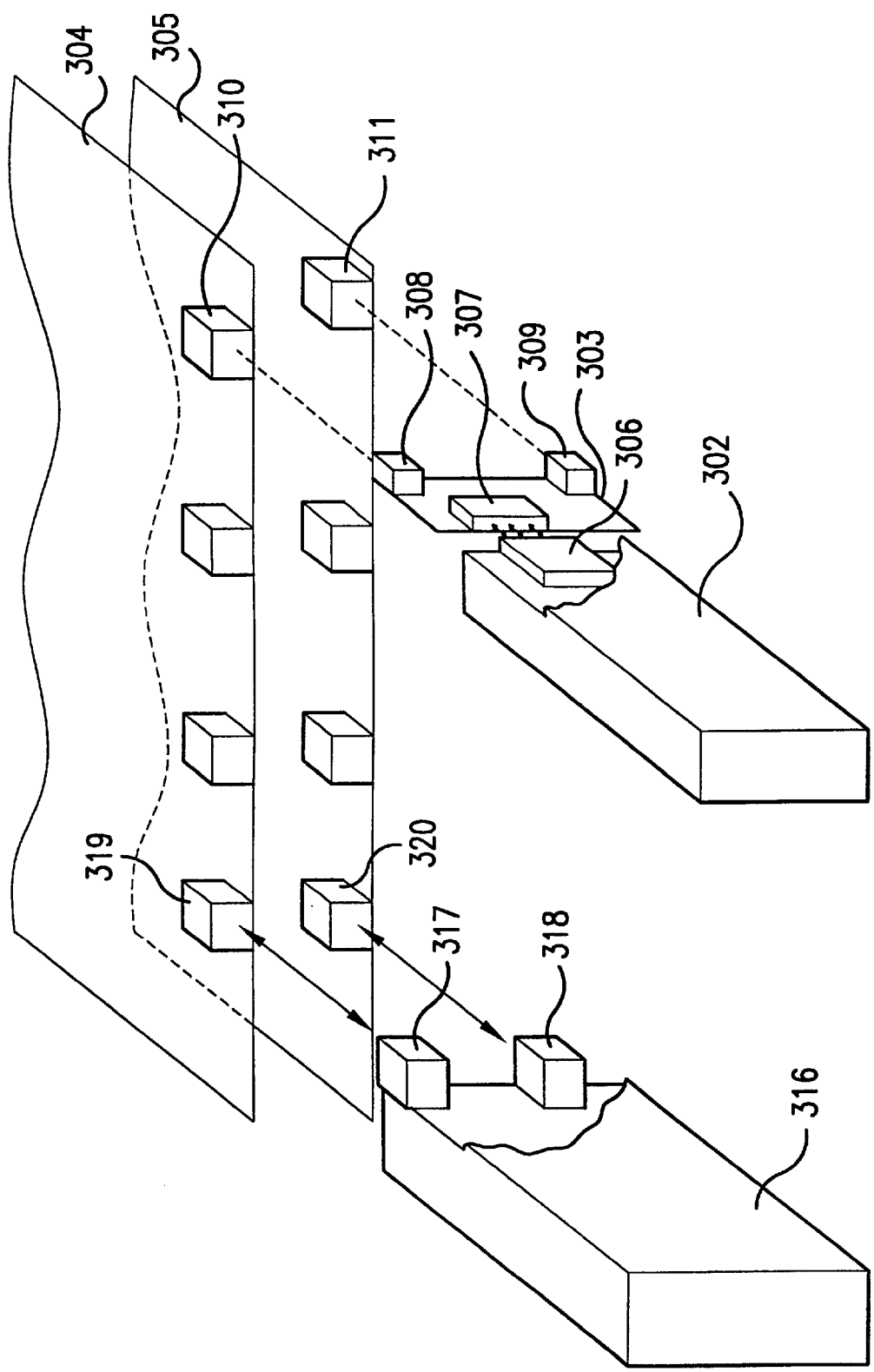
FIG. 3 illustrates interconnection of a data storage device with two controller cards within the highly available storage subsystem illustrated in FIG. 2.

FIG. 3 illustrates interconnection of a data storage device with two I/O controller cards within the highly available storage subsystem illustrated in FIG. 2. In one embodiment of the present invention, an older style data storage device 302 is coupled to an I/O adaptor card 303 which is, in turn, coupled to two I/O controller cards 304 and 305. The old-style data storage device includes a multi-pin adaptor 306 that, in currently available storage subsystems, such as the storage subsystem illustrated in FIG. 1, mates with a complementary adaptor affixed to the midplane circuit card. A similar complementary adaptor 307 is included on the I/O adaptor card 303. The complementary adaptor 307 is electronically interconnected via data, control signal, and power lines to the two I/O controller-card adaptors 308 and 309. The I/O controller-card adaptors 308 and 309, in turn, mate with complementary adaptors 310 and 311, respectively, affixed to I/O controller cards 304 and 305. In a second, preferred embodiment, a data storage device 316 includes two I/O controller-card adaptors 317 and 318 that directly mate with complementary adaptors 319 and 320, respectively, affixed to I/O controller cards 304 and 305. A data storage device may receive all necessary data, control signals, and power through either I/O controller-card adaptor, and may concurrently receive data, control signals, and power through both I/O controller-card adaptors. Logic within the I/O controllers, within the data storage devices, or within both the storage devices and the I/O controllers may determine which of the two I/O controller-card adaptors is employed for data and control signal transfer related to a particular I/O operation. The number and configuration of pins within the I/O controller-card adaptors can be varied depending on the nature of the storage device units and the particular I/O controller cards used. The formerly employed midplane circuit card adaptors may include redundant power pins that can be eliminated or that may not be actively used in the I/O controller-card adaptors.

Although the present invention has been described in terms of two particular embodiments, it is not intended that the invention be limited to these embodiments. Modifications within the spirit of the invention will be apparent to those skilled in the art. For example, many different types of I/O controller-card adaptors featuring different numbers of pins for interconnecting different numbers of data, control signal, and power lines may be employed, as noted above, for coupling different types of data storage devices to different types of I/O controller cards. The described embodiment relates to magnetic disk drives within a disk array, but the present invention may be employed to connect any number of different types of data storage devices to many different types of I/O controller cards. Embodiments related to highly available storage subsystems, like the described embodiment, may be employed in highly available computer systems and in many other types of electronic components and subsystems. In the described embodiments, when both I/O controller cards are operable, each data storage device receives data, control signals, and power concurrently from both I/O controller cards. However, in an alternative embodiment, during normal operation, a data storage device may receive data, control signals, and power from a first I/O controller card, and may fail-over to receiving data, control signals, and power from a second I/O controller card on failure of the first I/O controller card. While the described embodiment features two I/O controller cards for dual redundancy, alternative embodiments may employ a greater number of I/O controller cards for added redundancy and reliability, requiring that each data storage device include a number of I/O controller-card adaptors equal to the greater number of I/O controller cards. The present invention may find use in interconnecting electronics components other than data storage devices with circuit cards other than I/O controller cards. For example, a large multiplexor that interconnects a number of high bandwidth communications media with a number of different types of communications media may be configured similarly to the described storage subsystem, with networking cards plugged into redundant I/O controller cards. The elimination of a midplane circuit board may greatly assist the thermal management design of such multiplexor systems, along with eliminating a single point of failure.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A highly available mass storage system comprising:
   two or more power supplies, each power supply having the capacity to independently power the highly available mass storage system in the event that all other power supplies fail;
   a number of mass-storage devices; and
   two or more redundant I/O controller cards that each interconnects the number of mass storage devices with the two or more power supplies and with external communications media, each I/O controller card having the capacity to independently control the number of mass storage devices and to independently interconnect the number of mass storage devices with the two or more power supplies and with external communications media, each I/O controller card directly coupled to the number of mass-storage devices and to the two or more power supplies.

2. The highly available mass storage system of claim 1 wherein each mass-storage device has two or more separate data, signal, and power adapters, each data, signal, and power adapter mated to a complementary data, signal, and power adapter on a separate I/O controller card.

3. The highly available mass storage system of claim 1 wherein each mass-storage device has a single data, signal, and power adapter mated to a complementary data, signal, and power adapter of an I/O adapter card, the I/O adapter card having two or more additional data, signal, and power adapters, each data, signal, and power adapter mated to a complementary data, signal, and power adapter on a separate I/O controller card.

4. The highly available mass storage system of claim 1 wherein the highly available mass storage system has no midplane circuit board or other intermediary connection device that interconnects the two or more power supplies, the number of mass-storage devices, and the two or more redundant I/O controller cards and that represents a potential single point of failure.

5. A method for producing a highly available mass storage system having two or more power supplies, a number of mass-storage devices, and two or more redundant I/O controller cards that each interconnects the number of mass storage devices with the two or more power supplies and with external communications media, the method comprising:
   directly coupling each I/O controller card to the number of mass-storage devices; and
   directly coupling each I/O controller card to the two or more power supplies.

6. The method of claim 5 further including:
   removing a midplane circuit board or other intermediary connection device that interconnects the two or more power supplies, the number of mass-storage devices, and the two or more redundant I/O controller cards.

7. The method of claim 5 further including:
   directly coupling each I/O controller card to the number of mass-storage devices by mating a data, signal, and power adapter on the I/O controller card to one of two or more complementary data, signal, and power adapters on each mass-storage device.

8. The method of claim 5 further including:
   directly coupling each I/O controller card to the number of mass-storage devices by mating a data, signal, and power adapter on the I/O controller card to one of two or more complementary data, signal, and power adapters on a number of I/O adapter cards, each I/O adapter card having an additional data, signal, and power adapter mated to a complementary data, signal, and power adapter on a different mass-storage device, control signals, and power from both circuit cards via the midplane-circuit-card adaptor.

* * * * *